(12) United States Patent
Patel et al.

(10) Patent No.: US 10,899,931 B2
(45) Date of Patent: Jan. 26, 2021

(54) COMPOSITE PIGMENTS

(71) Applicant: SHAYONANO SINGAPORE PTE LTD, Singapore (SG)

(72) Inventors: Mahesh Dahyabhai Patel, Singapore (SG); Varadalambedu Srinivasan Nithianandam, Singapore (SG)

(73) Assignee: SHAYONANO SINGAPORE PTE LTD., Singapore (SG)

( * ) Notice: Subject to any disclaimer, the term of this patent is extended or adjusted under 35 U.S.C. 154(b) by 0 days.

(21) Appl. No.: 15/021,558

(22) PCT Filed: Sep. 12, 2014

(86) PCT No.: PCT/SG2014/000432
§ 371 (c)(1),
(2) Date: Mar. 11, 2016

(87) PCT Pub. No.: WO2015/038073
PCT Pub. Date: Mar. 19, 2015

(65) Prior Publication Data
US 2016/0222214 A1    Aug. 4, 2016

(30) Foreign Application Priority Data

Sep. 13, 2013 (GB) .................................. 1316316.7

(51) Int. Cl.
*C09C 1/00* (2006.01)
*C09D 7/00* (2018.01)
(Continued)

(52) U.S. Cl.
CPC .............. *C09C 1/0081* (2013.01); *C01G 9/02* (2013.01); *C09C 1/0015* (2013.01);
(Continued)

(58) Field of Classification Search
CPC .... C01G 9/02; C01P 2002/72; C01P 2002/76; C01P 2002/78; C01P 2004/03;
(Continued)

(56) References Cited

U.S. PATENT DOCUMENTS 2,882,178 A    4/1959  Dunn, Jr.
5,203,916 A    4/1993  Green et al.
(Continued)

FOREIGN PATENT DOCUMENTS

CN    101583566 A    11/2009
CN    103242821 A    8/2013
(Continued)

OTHER PUBLICATIONS

International Search Report, corresponding PCT/SG2014/000432, dated Nov. 3, 2014.
(Continued)

*Primary Examiner* — Shuangyi Abu Ali
(74) *Attorney, Agent, or Firm* — Lando & Anastasi, LLP

(57) ABSTRACT

There is provided a paint formulation comprising a composite pigment, said composite pigment being selected from the group consisting of metal oxide/silica, metal oxide/silicate, metal oxide/alumina, metal oxide/metal oxide and metal oxide/zirconia, wherein the size and amount of said composite pigment are selected to increase the opacity of said paint formulation.

5 Claims, 4 Drawing Sheets

(51) Int. Cl.
*C01G 9/02* (2006.01)
*C09C 1/30* (2006.01)
*C09C 1/04* (2006.01)
*C09D 7/62* (2018.01)
*C09D 7/40* (2018.01)
*C09D 7/61* (2018.01)
*C08K 3/22* (2006.01)
*C08K 3/36* (2006.01)

(52) U.S. Cl.
CPC ............ *C09C 1/0084* (2013.01); *C09C 1/043* (2013.01); *C09C 1/30* (2013.01); *C09D 7/61* (2018.01); *C09D 7/62* (2018.01); *C09D 7/67* (2018.01); *C01P 2002/72* (2013.01); *C01P 2002/76* (2013.01); *C01P 2002/78* (2013.01); *C01P 2004/03* (2013.01); *C01P 2004/04* (2013.01); *C01P 2004/34* (2013.01); *C01P 2004/64* (2013.01); *C01P 2004/80* (2013.01); *C01P 2004/82* (2013.01); *C01P 2004/84* (2013.01); *C01P 2006/12* (2013.01); *C08K 3/22* (2013.01); *C08K 3/36* (2013.01); *C08K 2003/2227* (2013.01); *C08K 2003/2244* (2013.01)

(58) Field of Classification Search
CPC .............. C01P 2004/04; C01P 2004/34; C01P 2004/64; C01P 2004/80; C01P 2004/82; C01P 2004/84; C01P 2006/12; C08K 2003/2227; C08K 2003/2244; C08K 3/22; C08K 3/36; C09C 1/0015; C09C 1/0081; C09C 1/0084; C09C 1/043; C09C 1/30; C09C 1/3054; C09D 7/1216; C09D 7/1225; C09D 7/1266

See application file for complete search history.

(56) References Cited

U.S. PATENT DOCUMENTS

| 6,200,680 | B1 |   | 3/2001  | Takeda et al.         |
|-----------|----|---|---------|-----------------------|
| 6,866,710 | B2 |   | 3/2005  | Heider et al.         |
| 6,866,711 | B2 | * | 3/2005  | Sinclair ..... C09C 1/027 |
|           |    |   |         |              106/400  |
| 2004/0139890 | A1 |   | 7/2004  | Sinclair et al.       |

| 2006/0167138 | A1 |   | 7/2006  | Ishii et al.          |
|--------------|----|---|---------|-----------------------|
| 2006/0216513 | A1 |   | 9/2006  | Musick et al.         |
| 2011/0104220 | A1 |   | 5/2011  | Schmidt et al.        |
| 2013/0259912 | A1 | * | 10/2013 | Suzuki ..... A61K 8/0283 |
|              |    |   |         |              424/401  |
| 2015/0290090 | A1 | * | 10/2015 | Matsufuji ..... A61K 8/29 |
|              |    |   |         |              424/401  |

FOREIGN PATENT DOCUMENTS

| EP | 0595341 A2 | 5/1994 |
| EP | 988853 A1 | 3/2000 |
| GB | 1532521 A | 11/1978 |
| JP | S63199275 A | 8/1988 |
| JP | H07-331110 A | 12/1995 |
| JP | 2004197099 A | 7/2004 |
| JP | 2007261082 A | 10/2007 |
| JP | 2009545509 A | 12/2009 |
| JP | 2012140286 A | 7/2012 |
| JP | 2012140520 A | 7/2012 |
| JP | 2014058652 A | 4/2014 |
| WO | 2008019905 A1 | 2/2008 |
| WO | 2008/079758 A1 | 7/2008 |
| WO | WO2011016139 * | 2/2011 |

OTHER PUBLICATIONS

GB2518202 Letter Notification of Grant dated Dec. 6, 2016.
GB2518202-20170104 Publication Document for application No. 1316316.7 dated Jan. 4, 2017.
Office Action in Application No. CN201480049554.9 dated Dec. 29, 2016.
Office Action in Application No. CN201480049554.9 dated Sep. 25, 2017.
Office Action in Application No. CN201480049554.9 dated Jan. 2, 2018.
Office Action in Application No. JP2016-541937 dated Feb. 6, 2018.
Search Report in Application No. EP 14844848 dated Jul. 10, 2017.
Office Action #15651 in Application No. CO16-092.498.
Office Action #1980 in Application No. CO16-092.498.
Official Notification in Application No. 201690586.
Office Action in Application No. CL201600563.
Database WPI, Week 198839, Thomson Scientific, London, GB.

* cited by examiner

COMPOSITE PIGMENTS

TECHNICAL FIELD

The present invention generally relates to composite pigments. The composite pigments may be used in a paint formulation so as to increase the opacity of the paint formulation.

BACKGROUND

The application of nanomaterials to various industrial uses has gathered substantial interest both industrially and academically. The main motivating force for this momentum is the ability of nanomaterials, with their near-atomic dimensions, to substantially improve the properties of final products.

For example, nanomaterials have been used in coating applications. Metal oxides like nano-titanium dioxide and silicon dioxide have been extensively used to formulate polymeric coatings to provide properties like photo-catalysis and excellent abrasion resistance.

Titanium dioxide ($TiO_2$) is the pervasive and unchallenged pigment in the coating industry mainly due to its excellent ability to scatter visible light. Thus, $TiO_2$ has very high refractive index and has been commonly used to enhance the opacity of paints. However, the price of $TiO_2$ in recent years has fluctuated very widely and increased substantially. This prevents $TiO_2$-based paints from being economically competitive. Furthermore, conventional paints for external architectural use often experience "yellowing" due to the exposure to solar radiation. High humidity and frequent rainfall in the tropical region also result in bacterial and algae growth on walls.

The opacity or hiding power of paints depends on numerous factors such as particle size, crystalline phase of pigment, refractive index of pigments and polymer, and the dispersion or crowding of individual pigment particles. All these factors influence the back scattering of the light by individual pigment particles. Pigment crowding of $TiO_2$ is the most important consideration in designing of paints. This is because even though $TiO_2$ confers opacity to the paints, by increasing the $TiO_2$ content in the paint above a certain point, the pigment particles are brought to close proximity of each other, thereby interfering with the ability of such pigments to scatter light efficiently.

To overcome the problem of pigment crowding, extender pigments possessing smaller dimensions are used as spacer units to isolate $TiO_2$ pigments and increase the hiding power of the paints.

The concept of using the spacer material along with $TiO_2$ pigments to improve opacity of the paint has been known for some time. For example, there is a known product that uses differences in refractive index between the different materials to increase scattering. Other known products physically coat the $TiO_2$ pigment to enhance the separation. Clays may also be used for such an application as they have high surface area. However, it has been difficult to practice such applications commercially due to requirement of large amount of spacer material leading to high comparative cost of the paint. Furthermore clays as spacer material also tend to decrease the gloss of the final paint film and alter rheological properties of the paint.

Alternatively commercial micron sized zinc oxide particles with a refractive index of 2.01 can be used as the pigment. However, commercial micron-sized zinc oxide possesses larger average particle dimensions and thus, suffers from lower surface area. As a result, commercial micron-sized zinc oxide has little or negligible power to influence the opacity provided by $TiO_2$ pigments. In addition, while nano-sized zinc oxide particles are able to increase the opacity of a paint formulation, such paint formulations have been shown to be unstable (as evidenced by the increase in the viscosity of the paint formulation to the point of gelation) when stored for long periods of time such as two to three months. In addition, formulation of water based paints using ZnO requires careful consideration of various parameters and materials. The interaction of ZnO with $TiO_2$ is very strong under the alkaline pH range that normally prevails in water based paints. This invariably results in poor stability of the paint leading to progressive increase in viscosity and possible irreversible gelling at room temperature. The paint often fails in accelerated storage test conducted at 60° C. for 14 days.

Further, other pigments such as white lead, zinc sulphide, lithopone and antimony oxide have also been used as alternative pigments in paints. However, $TiO_2$ pigments are always ultimately chosen due to its higher refractive index.

There is, therefore, a need to provide paint formulations that overcomes, or at least ameliorates, one or more of the disadvantages described above. There is a need to provide stable paint formulations that overcomes, or at least ameliorates, one or more of the disadvantages described above.

SUMMARY

According to a first aspect, there is provided a paint formulation comprising a composite pigment, said composite pigment being selected from the group consisting of metal oxide/silica, metal oxide/silicate, metal oxide/alumina, metal oxide/metal oxide and metal oxide/zirconia, wherein the size and amount of said composite pigment are selected to increase the opacity of said paint formulation.

The composite pigment may have opaque properties and hence may be used to maintain or enhance the opacity of the paint or paint formulation. The composite pigment may reduce the amount of titanium dioxide that is required in the paint formulation due to the opaque properties of the composite pigment. Hence, the composite pigment may be an alternative to titanium dioxide. Due to the replacement of the more expensive titanium dioxide with the composite, the costs of producing the paint or paint formulation may be effectively reduced.

As the composite pigment enhances the opacity of the paint formulation, the composite pigment may not affect the stability of the paint formulation. Hence, the composite pigment may at least maintain the stability of the paint formulation or may increase the stability of the paint formulation. Hence, the composite pigment may be able to enhance the opacity of the paint formulation while not affecting the stability of the paint formulation, or have any detrimental effect on the stability of the paint formulation. This is compared to prior art opacity enhancing agents in which the stability of the paint formulation decreases over time.

The composite pigment may be able to maintain or enhance the stability of the paint or paint formulation when stored for a period of time. The composite may enable the paint or paint formulation to be resistant to viscosity changes. The composite may prevent or at least reduce the gelation or agglomeration of the paint or paint formulation during storage for a period of time.

In a second aspect, there is provided a method for preparing a paint formulation comprising the step of incorporating in the paint formulation an effective amount of a composite pigment selected from the group consisting of metal oxide/silica, metal oxide/silicate, metal oxide/alumina, metal oxide/metal oxide and metal oxide/zirconia in order to increase the opacity of said formulation.

In a third aspect, there is provided a composite pigment comprising a metal oxide as a first component and a second component selected froth the group consisting of silica, silicate, alumina, metal oxide and zirconia.

DEFINITIONS

The following words and terms used herein shall have the meaning indicated:

The term "nano-sized" is to be interpreted broadly to relate to an average particle size of a particle of less than about 1000 nm, less than about 300 nm, between about 200 nm to about 300 nm, between about 5 nm to about 200 nm or less than about 100 nm. The particle size may refer to the diameter of the particles where they are substantially spherical. The particles may be non-spherical and the particle size range may refer to the equivalent diameter of the particles relative to spherical particles.

The term "opacity", and grammatical variants thereof, is used to denote the impermeability of a coating to light.

The term "stable", when referring to a paint or paint formulation, refers to the ability of the paint or paint formulation to be stirred to form a homogeneous liquid even when stored at long periods of time. The viscosity of the paint or paint formulation may be a measure of the stability of the paint or paint formulation such that a stable paint or paint formulation is considered as one in which the viscosity remains substantially constant or does not increase substantially during storage of the paint or paint formulation. During accelerated storage experiments, a stable paint is one which has a viscosity increase of about less than 20 KU units. For the avoidance of doubt, any paint or paint formulation that results in gelation or agglomeration when stored for a period of time is considered as "unstable The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical, variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a paint formulation will now be disclosed. The paint formulation comprises a composite pigment, said composite pigment being selected from the group consisting of metal oxide/silica, metal oxide/silicate, metal oxide/alumina, metal oxide/metal oxide and metal oxide/zirconia, wherein the size and amount of said composite pigment are selected to increase the opacity of said paint formulation.

There is also provided a composite pigment comprising a metal oxide as a first component and a second component selected from the group consisting of silica, silicate, alumina, metal oxide and zirconia. The metal oxide in said composite may be selected from the group consisting of zinc oxide, aluminium oxide, antimony oxide, magnesium oxide, barium oxide and zirconium oxide. In one embodiment, the metal oxide is zinc oxide.

The wt % of the composite pigment in the paint formulation may be in the range of about 1 wt % to about 5 wt %, based on the total weight of the paint formulation. The wt % of the composite pigment in the composition may be in the range selected from the group consisting of about 1 wt % to about 4 wt %, about 1 wt % to about 3 wt %, about 1 wt % to about 2 wt %, about 2 wt % to about 5 wt %, about 2 wt % to about 4 wt % and about 2 wt % to about 3 wt %. In one embodiment, the wt % of the composite pigment may be about 2 wt %.

The particle size of the metal oxide in the composite pigment may be in the nano-range. The particle size of the metal oxide in the composite may be in the range selected from the group consisting of about 5 nm to about 100 nm, about 5 nm to about 80 nm, about 5 nm to about 60 nm, about 5 nm to about 40 nm, about 5 nm to about 20 nm, about 20 nm to about 100 nm, about 40 nm to about 100 nm, about 60 nm to about 100 nm and about 80 nm to about 100 nm. In one embodiment, the particle size of the metal oxide in the composite may be about 10 nm.

The surface area of the composite may be selected from the range of about 20 $m^2/g$ to about 100 $m^2/g$, about 20 $m^2/g$ to about 80 $m^2/g$, about 20 $m^2/g$ to about 60 $m^2/g$, about 20 $m^2/g$ to about 40 $m^2/g$, about 40 $m^2/g$ to about 100 $m^2/g$, about 60 $m^2/g$ to about 100 $m^2/g$ or about 80 $m^2/g$ to about 100 $m^2/g$.

The composite may be made either in a two-step method or in a one-step method. In the two-step method, the metal oxide particles are formed first followed by precipitation or coating with the silica or alumina on the metal oxide. Where the metal oxide is zinc oxide, the zinc oxide may be made by mixing zinc salts in a base and collecting the precipitates of zinc oxide formed. A surfactant or dispersant may be added to reduce the particle size of the zinc oxide particles such that the formed zinc oxide particles are in the nano-range. The zinc salt used may be selected from the group consisting of zinc nitrate salt (such as zinc nitrate hexahydrate), zinc acetate and zinc chloride. The base may be selected from the group consisting of sodium hydroxide, potassium hydroxide or calcium hydroxide. It is to be appreciated that the method to make the zinc oxide is not limited to the above method and can encompass any method known to form nano-sized zinc oxide particles. Following which, an amine surfactant may be added to create a charge on the zinc oxide particles. Silica or alumina (or their precursors) is then added to form a composite with the zinc oxide. To enhance the precipitation or coating of the silica or alumina on the zinc oxide particles, a charge modifier may be added. The charge modifier may be aluminium chloride solution which functions to precipitate or coat silica on the zinc oxide particles by disturbing its residual charge.

The one step method may involve a reaction mixture comprising a metal salt, a base solution and a precursor of silica or alumina. Where the metal oxide to be formed is zinc oxide, the metal salt may be zinc salt selected from the group consisting of zinc nitrate salt (such as zinc nitrate hexahydrate), zinc acetate and zinc chloride. A surfactant or dispersant may be added to reduce the particle size of the zinc oxide particles such that the formed zinc oxide particles are in the nano-range. The base may be selected from the group consisting of sodium hydroxide, potassium hydroxide or calcium hydroxide. During formation of the composite, the pH of the reaction mixture may be adjusted appropriately. The pH of the reaction may be in the range of 7 to 10. By adjusting the pH of the reaction during formation of the composite, uniform coating of the metal oxide particles can be achieved. The silica precursor may be sodium silicate solution while the alumina precursor may be aluminium chloride hexa hydrate, Sodium aluminate or colloidal alumina.

Once the composite is formed, the composite may be separated from the reaction mixture by filtration or centrifugation. The composite may be washed with water and dried.

The silica, silicate, zirconia or alumina may be formed as a coating that at least partially surrounds the metal oxide particle. Hence, the metal oxide component may be at least partially covered by the silica, silicate, zirconia or alumina (that is, the second component)

The metal oxide particle may be dispersed or embedded in the silica, silicate, zirconia or alumina phase. The silica, silicate, zirconia or alumina phase may be a continuous phase. The silica phase may be a continuous amorphous phase.

The composite may have a homogeneous morphology or an inhomogeneous morphology. The composite may have a multifaceted homogeneous morphology. The composite may be a mixture of nanorods and multifaceted (inhomogeneous) morphology.

Where the metal oxide in the composite is zinc oxide, the zinc oxide may have a hexagonal structure.

The composite pigment may be of the core-shell structure. The core of the core-shell structure may be hollow or empty while the shells of the core-shell structure are made up of alternating layers of the metal oxide layer (or first component layer) and silica, silicate, zirconia, metal oxide or alumina layer (or second component layer). The silica, silicate, zirconia, metal oxide or alumina layer (or second component layer) may at least partially cover the metal oxide layer (or first component layer). The number of layers is not particularly limited.

In the above embodiments, the difference in refractive indices of different layered materials improves the back scattering of light. In the core-shell structure, more substantial difference in refractive index are created by forming a hollow layered inorganic composite pigment. Such a pigment upon drying leaves a hollow space that helps in better back scattering of light, leading to better opacity.

The composite may act as a substitute for titanium dioxide in the paint formulation while keeping the opacity of the paint formulation substantially the same or even increased as compared to a conventional paint formulation without the composite. The composite may maintain or enhance the stability of the paint formulation while maintaining or increasing the opacity of the paint formulation.

The composite may act as a substitute to replace up to 30% of titanium dioxide particles in the paint formulation. The composite may replace up to 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2% or 1% of the titanium dioxide particles in the paint formulation.

The paint formulation may have an opacity in the range selected from the group consisting of greater than 85%, greater than 86%, greater than 87%, greater than 88%, greater than 89%, greater than 90%, greater than 91%, greater than 92%, greater than 93%, greater than 94%, greater than 95%, greater than 96%, greater than 97%, greater than 98% and greater than 99%. Hence, the substitution of conventional titanium dioxide particles with the composite may not substantially affect the opacity of the paint formulation. Accordingly, it is possible to use a lesser amount of the titanium dioxide, which is typically used to make paint coatings opaque, without compromising on the opacity and/or stability of the paint formulation.

The paint formulation may have substantially the same opacity or increased opacity as compared to another paint formulation without the composite.

The metal oxide in said composite may be selected from the group consisting of zinc oxide, barium oxide, aluminium oxide, antimony oxide, magnesium oxide and zirconium oxide. In one embodiment, the metal oxide is zinc oxide.

The composite pigment may be toxic to microbes and hence may have an anti-microbial (such as anti-bacterial or anti-fungal) effect. Hence, the composite pigment in a paint formulation may be able to enhance the opacity of the paint formulation while maintaining or enhancing the stability of the paint formulation. At the same time, the composite pigment may be able to exert an anti-microbial effect so as to increase the durability and life-time of the paint formulation. When the paint formulation is applied to a surface and dried, the anti-microbial effect of the composite pigment may also be expanded to the dried paint.

The composite having a metal oxide such as zinc oxide may function as a UV absorbent and may confer anti-microbial properties to the paint formulation. This may be due to the particle size of the zinc oxide, such as lesser than 40 nm, which result in these properties. Hence, the overall durability of the paint formulation may be improved with the incorporation of the composite in the paint formulation.

The paint formulation may be an acrylic water based paint, a water based vinyl paint, a polyurethane paint, an alkyd paint, a thermosetting paint and a solvent based paint.

There is also provided a method for preparing a paint formulation comprising the step of incorporating in the paint formulation an effective amount of a composite pigment selected from the group consisting of metal oxide/silica, metal oxide/silicate, metal oxide/alumina, metal oxide/metal oxide and metal oxide/zirconia in order to increase the opacity of said formulation.

The effective amount of the composite pigment in the paint formulation may be in the range of 1 wt % to 5 wt %, based on the total weight of the paint formulation.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 2(a) is at low magnification, FIG. 2(b) is at a higher magnification, and FIG. 2(c) is at high resolution. The magnifications of these figures are indicated indirectly by the "line scale" corresponding to the size in nano-meter.

FIG. 4(a) is at low magnification, FIG. 4(b) is at higher magnification, and FIG. 4(c) is at high resolution. The magnifications of these figures are indicated indirectly by the "line scale" corresponding to the size in nano-meter.

EXAMPLES

Non-limiting examples of the invention will be further described in greater detail by reference to specific Examples and a comparative example, which should not be construed as in any way limiting the scope of the invention.

Example 1

Direct In-Situ Preparation of Nano-ZnO-Silica Composite 204 grams of anhydrous zinc chloride (obtained from Mega chemicals, Singapore) was dissolved in 150 grams of water and 0.5 grams of Indoemul CO-02 was added to this solution and stirred at 1500 RPM for 5 minutes. 300 grams of 40% sodium hydroxide was added to this stirred solution for a period of 2.5 hours. The reaction mixture was then stirred for 2 additional hours. The pH of the reaction mixture was then adjusted to 7 to 7.5 using glacial acetic acid and 15.6 grams of sodium silicate solution (10% sodium oxide and 28% silicon dioxide, obtained from SD Fine chemicals Ltd, Mumbai of India) was added. The pH was adjusted from 10 to 8.5 and reaction mixture was stirred for one hour until pH gradually reaches 9.5. The pH was again adjusted to 7.5 and the reaction mixture was stirred for an additional one hour. The reaction mixture was then filtered and washed with water. The filtered solid was dried in an oven at 80° C. for 24 hours.

Figure 1:
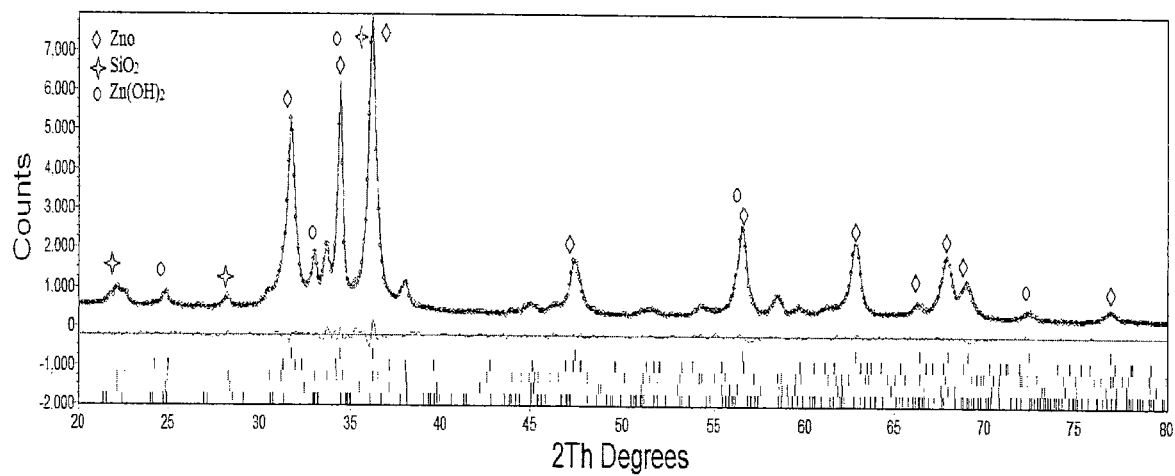
FIG. 1 shows the X-Ray Diffraction (XRD) pattern of silica coated on nano zinc oxide composite formed in accordance with Example 2.
Figure 2:
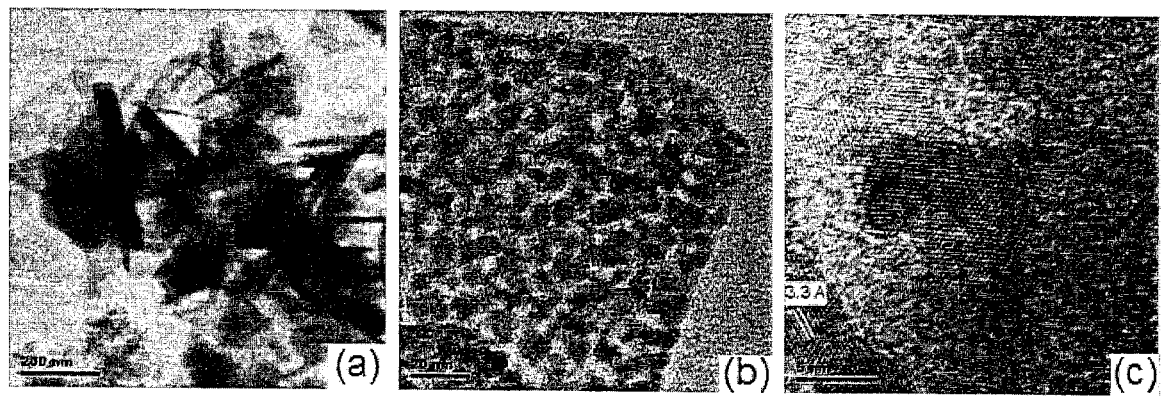
FIG. 2 shows a transmission electron micrograph (TEM) of silica coated on nano zinc oxide composite formed in accordance with Example 2.

The dried solid was powdered and characterised using BET surface area analysis (21.97 m$^2$/g), XRD (see FIG. 1) and TEM (FIG. 2).

From the XRD pattern of FIG. 1, the major peaks are at about 31.76, 34.39, 36.24, 47.52, 56.59, 62.81, 66.37 and 67.92 (° 2θ), which confirmed the presence of ZnO with hexagonal structure (space group—P63mc). Using Scherrer's equation, the crystalline size of 23.5 nm was calculated. The remaining peaks correspond to $SiO_2$ and $Zn(OH)_2$. From the pattern, it is evident that the formation of $SiO_2$ was amorphous. After silica coating on ZnO, this shifted the ZnO peaks 0.02 Å towards the left side which confirmed the presence of $SiO_2$.

From the TEM image of FIG. 3(a), it can be seen that the synthesized powder had an inhomogeneous morphology, which is a mixture of nanorods and multifaceted morphology. Higher magnification (see FIG. 3(b)) showed that the nanorods consisted of ~10 nm ZnO embedded in a continuous amorphous $SiO_2$ phase. The inter-planar spacing (see FIG. 3(c)) was 3.3 Å and was close to the inter-planar spacing of (100) plane of ZnO (3.25 Å).

Example 2

Synthesis of Nano Zinc Oxide-Silica Composite

About 90 grams of nano ZnO (obtained from Example 1) was suspended and stirred in 105 ml of water with 0.1 grams of tertiary amine surfactant-Coco bis (hydroxyl ethyl) amine (Indoemul CO-02, obtained from Indoamine Ltd, Baroda of India). 15 grams of a 30% solution of commercial Colloidal Silica (Bindzil, obtained from Akzo Nobel, Netherlands) was added to this suspension and stirred at 1500 rpm for 15 minutes. Then 0.7 grams of 10% aluminium chloride (obtained from Access Chemicals, Singapore) solution was added to the reaction moisture and stirred for 1 hour. The thick paste obtained was dried in an oven and used for characterization. The surface area of the powder was 23.43 m$^2$/g.

Example 3

Paint Formulation Using Nano-ZnO-Silica Composite

The nano-ZnO-silica composite obtained from Example 1 together with titanium dioxide ($TiO_2$) as the main pigment was used to formulate an acrylic water-based paint. The formulation was named "N—ZnO-silica composite Formulation". The weight of the $TiO_2$ present in this formulation was reduced as compared to that present in the Standard Formulation described below. A comparative acrylic water-based paint formulation based on $TiO_2$ pigments alone was made. This formulation was named "Standard Formulation".

When the $TiO_2$ was replaced in the "N—ZnO-silica composite Formulation" with the composite, there was a decrease in the total pigment volume. This decrease in pigment volume was compensated by increasing the amount of silica and/or talc to keep the pigment volume concentration the same in the formulations shown in Table 1 below.

Contrast Ratio was measured using the ZEHNTNER Reflectometer (Zehntner Testing Instruments, Switzerland). Accelerated storage studies were made by storing the paint at 60° C. for fourteen days and assessing the paint appearance visually for any cake formation, hard settlement and paint flow.

TABLE 1

Paint formulation using Nano-ZnO-silica composite

| No. | Materials | Standard Formulation (in grams) | n-ZnO-Silica Formulation (in grams) |
| --- | --- | --- | --- |
| 1. | Thickener: Bermocoll E411 (Akzo Nobel, Netherlands | 0.50 | 0.50 |

TABLE 1-continued

Paint formulation using Nano-ZnO-silica composite

| No. | Materials | Standard Formulation (in grams) | n-ZnO-Silica Formulation (in grams) |
|---|---|---|---|
| 2. | Anti-Microbial Agent: Zinc Omadine (Arch Chemicals, USA) | 1.00 | 1.00 |
| 3. | Dispersing agent: Orotan 1850E-Dow Chemicals, USA) | 1.00 | 1.00 |
| 4. | Defoamer: Dapro 7010 (Elementis Korea) | 0.25 | 0.25 |
| 5. | Water | 18.94 | 20.34 |
| 6. | n-ZnO-Silica composite | -NA- | 2.00 |
| 7. | Titanium dioxide R900 (Dupont, USA) | 23.00 | 16.67 |
| 8. | Calcium Carbonate | 3.64 | 5.62 |
| 9. | Talc | 1.87 | 2.82 |
| 10. | Fumed Silica | 0.30 | 0.30 |
| 11. | Acrylic Resin emulsion (UCAR™ 362, obtained from The Dow Chemical Company, California, USA) | 35.00 | 35.00 |
| 12. | ROPAQUE™ emulsion (obtained from The Dow Chemical Company, California, USA) | 12.00 | 12.00 |
| 13. | Texanol (obtained from Eastman Chemical Company, Tennessee, USA) | 0.70 | 0.70 |
| 14. | 2-Amino-2-methyl-1-propanol + 5% water (AMP™-95 obtained from The Dow Chemical Company, California, USA) | 0.30 | 0.30 |
| 15 | Mono Ethylene Glycol (Dow Chemicals, USA) | 1.00 | 1.00 |
| 16 | Tergitol NP 9 (Dow Chemicals, USA) | 0.50 | 0.50 |
| | Contrast Ratio (Opacity) (%) | 95.15 | 95.84 |
| | Accelerated storage test | Pass- Paint with slightly reduced flow | Pass-- homogeneous Paint with slightly more viscosity and reduced flow |

As shown in Table 1 above, the stability and opacity of the paint formulation with the composite are comparable to that of the paint formulation without the composite. In addition, the composite can reduce the amount of titanium dioxide required by about 27%, leading to cost savings.

Example 4

Direct In-Situ Preparation of Nano-ZnO-Alumina Composite 68 grams of anhydrous zinc chloride was dissolved in 90 ml of water and 2.5 grams of anionic dispersing agent Coatex P90 (obtained from Arkema, USA) was added to this solution and stirred at 1500 RPM for 5 minutes. 100 grams of 40% sodium hydroxide was added to this stirred solution for a period of 2.5 hours. The reaction mixture was then stirred for 2 additional hours. The pH of the reaction mixture was then adjusted 8.5 using glacial acetic acid. About 12.2 grams of aluminium chloride hexa hydrate was added and pH of the reaction turns to 7. About 14 grams of 40% sodium hydroxide was added for fifteen minutes with very good agitation. The pH of the reaction was maintained at 8.0 to 8.5 for a period of 1.5 hours. The precipitated solid was then filtered, washed with water and dried 80 degree C. oven for 24 hours.

The surface area of the powder from the dried solid was 78.9 m$^2$/g. The XRD pattern and TEM of nano-ZnO-alumina composited are shown in FIG. 3 and FIG. 4 respectively.

Figure 3:
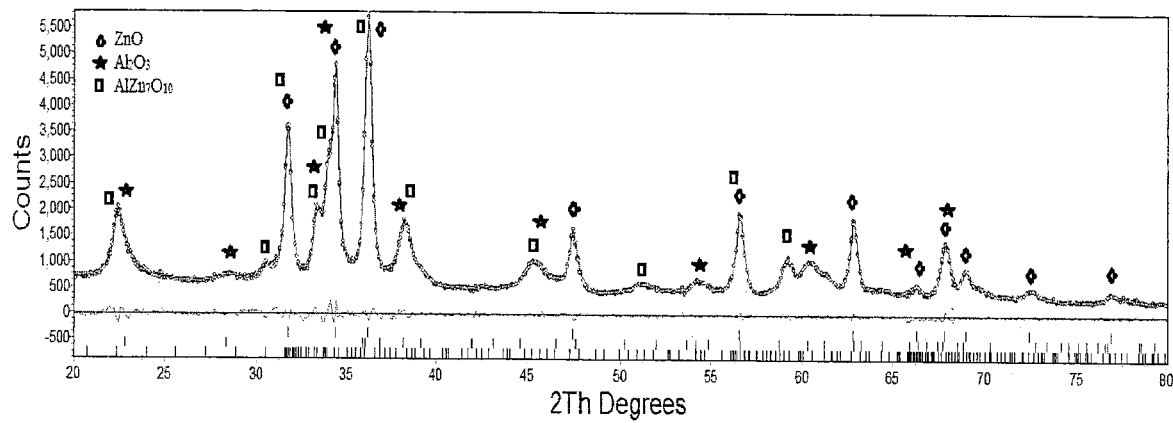
FIG. 3 shows a XRD pattern of alumina coated on nano zinc oxide composite formed in accordance with Example 4.
Figure 4:
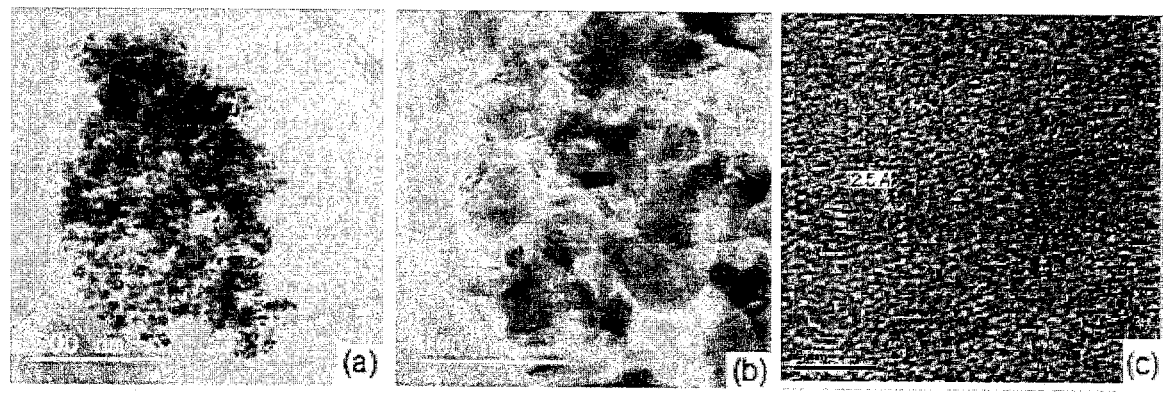
FIG. 4 shows a TEM of alumina coated on nano zinc oxide composite formed in accordance with Example 4.

From the XRD pattern of the alumina coated on nano ZnO composite as shown in FIG. 3, the major peaks are at about 31.76, 34.39, 36.24, 47.52, 56.59, 62.81, 66.37 and 67.92 (° 2θ), which confirmed the presence of ZnO with hexagonal structure (space group—P63mc). Using Scherrer's equation, the crystalline size of 25.1 nm was calculated. Along with nano ZnO, the other phases of $Al_2O_3$ and $AlZn_7O_{10}$ were formed. Form the pattern, it is obvious that the crystalline phase of $Al_2O_3$ was coated on nano ZnO and which confirmed the presence of composite coating.

The TEM images (FIG. 4(a), FIG. 4(b)) showed that the synthesized powder was multifaceted phase. The inter-planar spacing (see FIG. 4(c)) was 2.5 Å and was close to the inter-planar spacing of (002) plane of ZnO (2.6 Å).

Example 5

Hollow Silica Based Composite Pigment 30 grams of Nano Calcium Carbonate (obtained from Nano Materials Technology Pte Ltd, Singapore) was suspended in 300 ml of rapidly stirring water. About 34.8 grams of Tetra ethyl ortho silicate (obtained from Sinopharm Chemical Reagent Company Limited, China) was added and pH was adjusted to 8.5 with ammonia. The reaction mixture was then stirred for 1 hour and pH was adjusted to 6 by slowly adding glacial acetic acid. After all the carbon dioxide evolution ceases, the sample of hollow silica was isolated by filtration and drying.

The above reaction can directly be converted into hollow silica-zinc oxide-silica composite pigment. About 408 grams of anhydrous zinc chloride was dissolved in the reaction mixture followed by Indoemul co-02 (0.25 grams). 450 grams of 546 sodium hydroxide solution was added for 2.5 hours. The reaction mixture was stirred for additional 2 hours and pH was adjusted to 8-8.5 About 33 grams of colloidal silica was added to this reaction mixture and stirred for 1 hour. At the end of the reaction, hollow composite pigment was filtered and washed with water and dried in oven at 80 degree Celsius.

TABLE 2

Paint formulation using Hollow silica-ZnO-silica composite

| No. | Materials | Standard Formulation (in grams) | n-ZnO-Silica Formulation (in grams) |
|---|---|---|---|
| 1. | Thickener: Bermocoll E411 (Akzo Nobel, Netherlands | 0.40 | 0.40 |
| 2. | Anti-Microbial Agent: Zinc Omadine (Arch Chemicals, USA) | 1.00 | 1.00 |
| 3. | Dispersing agent: Orotan 1850E-Dow Chemicals, USA) | 1.00 | 1.00 |
| 4. | Defoamer: Dapro 7010 (Elementis Korea) | 0.25 | 0.25 |
| 5. | Water | 22.54 | 22.14 |
| 6. | Hollow Silica-ZnO-Silica composite | -NA- | 2.00 |

TABLE 2-continued

Paint formulation using Hollow silica-ZnO-silica composite

| No. | Materials | Standard Formulation (in grams) | n-ZnO-Silica Formulation (in grams) |
|---|---|---|---|
| 7. | Titanium dioxide R900 (Dupont, USA) | 23.00 | 16.98 |
| 8. | Calcium Carbonate | 4.94 | 7.42 |
| 9. | Talc | 1.86 | 2.57 |
| 10. | Fumed Silica | 0.30 | 0.30 |
| 11. | Acrylic Resin emulsion (UCAR™ 362, obtained from The Dow Chemical Company, California, USA) | 34.00 | 34.00 |
| 12. | ROPAQUE™ emulsion (obtained from The Dow Chemical Company, California, USA) | 9.00 | 9.00 |
| 13. | Texanol (obtained from Eastman Chemical Company, Tennessee, USA) | 1.00 | 1.00 |
| 14. | 2-Amino-2-methyl-1-propanol + 5% water (AMP™-95 obtained from The Dow Chemical Company, California, USA) | 0.30 | 0.30 |
| 15 | Mono Ethylene Glycol (Dow Chemicals, USA) | 1.00 | 1.00 |
| 16 | Tergitol NP 9 (Dow Chemicals, USA) | 0.50 | 0.50 |
|  | Contrast Ratio (Opacity) (%) | 95.84 | 95.89 |
|  | Accelerated storage test | Pass- Paint with slightly reduced flow | Pass-- homogeneous Paint with slightly more viscosity and reduced flow |

Comparative Example 1

Synthesis of Nano Zinc Oxide in Methanol/Water 32 grams of zinc nitrate hexahydrate (obtained from Accesschem Pte Ltd, Singapore) was dissolved in 67.5 grams of methanol (obtained from Accesschem Pte Ltd, Singapore) and 40 grams of water.

8.7 grams of sodium hydroxide (obtained from Sigma Aldrich, Missouri, United States of America) was dissolved in 40 grams of water separately and added to the zinc nitrate hexahydrate mixture slowly over a period of 1 hour and 15 minutes.

After the addition, the reaction was stirred for 1.5 hours. Thereafter, about 120 ml of water was added and the mixture was stirred for additional 1.5 hours.

The reaction mixture was then filtered and washed with water till the filtrate showed a pH of 7. The solid residue material obtained was dried in an oven at 80° C. and grounded to get fine white powder.

Characterization of Nano Zinc Oxide

Figure 5:
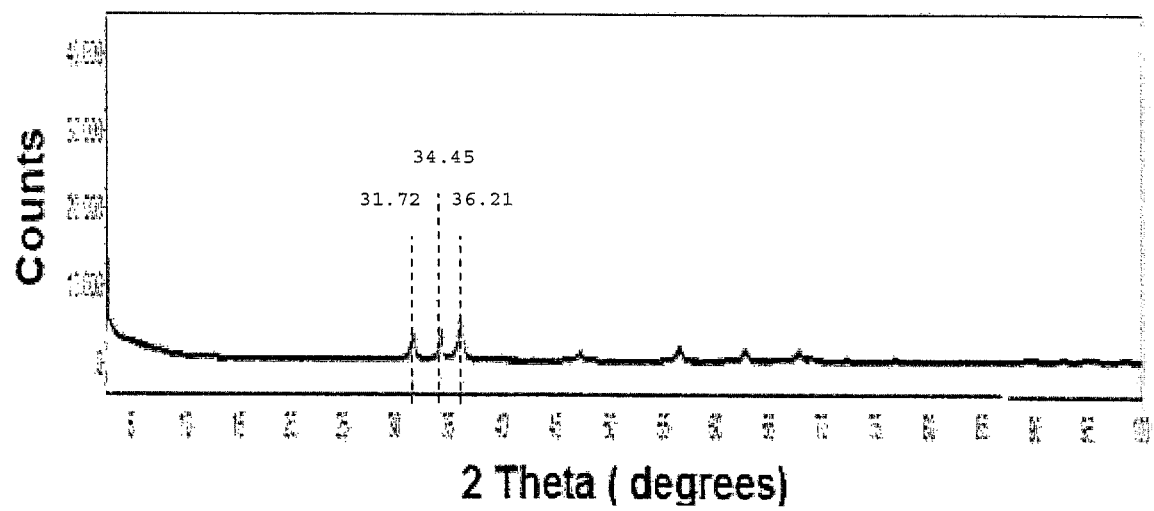
FIG. 5 is a X-ray diffraction pattern of the nano zinc oxide obtained in Comparative Example 1.
Figure 6:
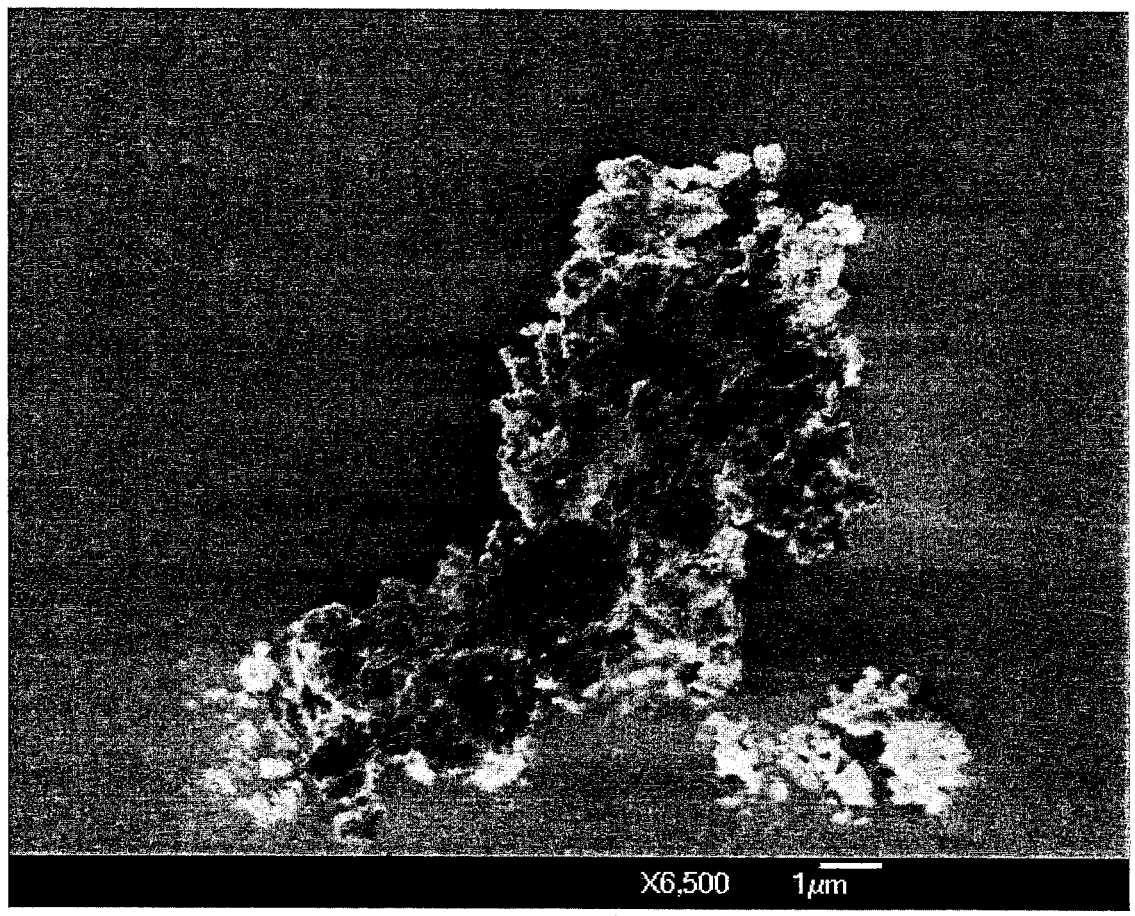
FIGS. 6 and 7 are scanning electron microscopy images showing the hollow silica-based composite particles.
Figure 7:
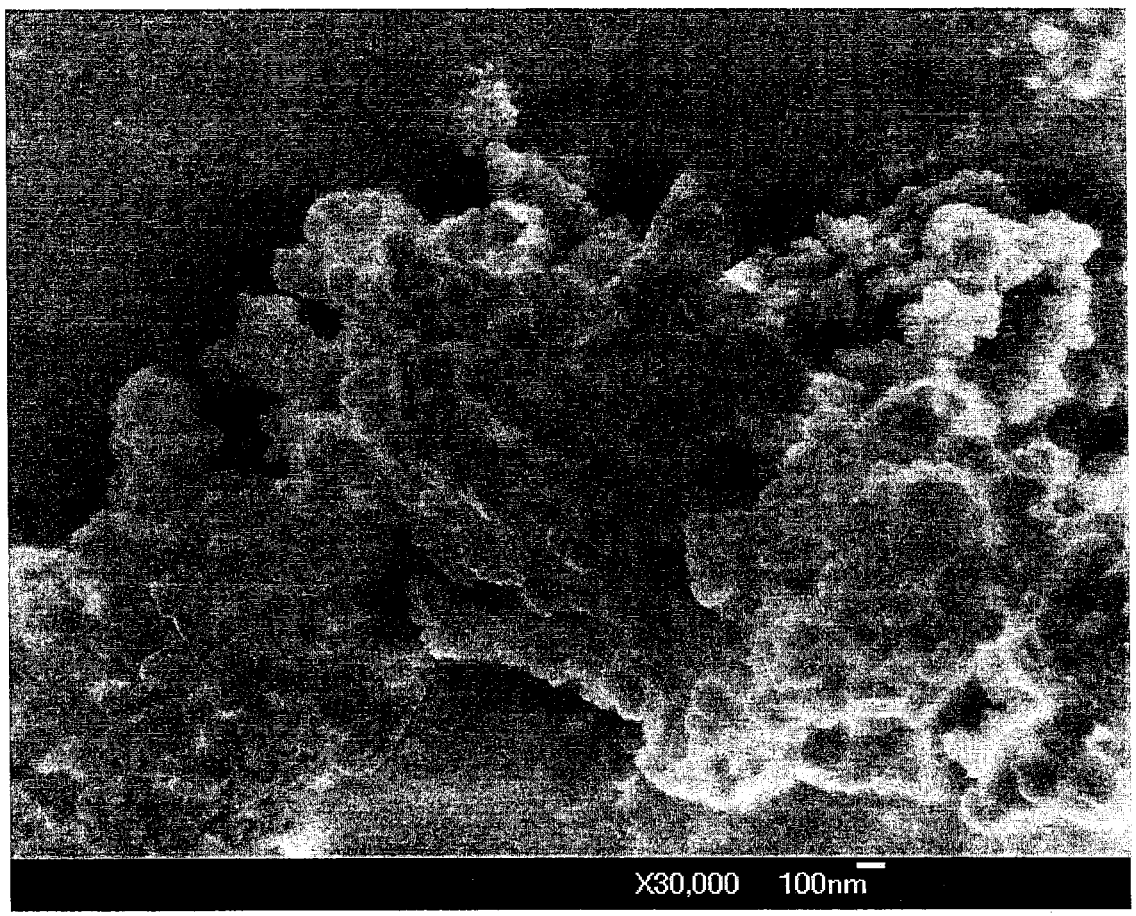

The fine white powder was analyzed by X-ray diffraction (XRD) and the XRD pattern is shown in FIG. 5. From FIG. 5, the XRD pattern confirms that pure zinc oxide (ZnO) was obtained. Specifically, the three main 2 Theta peak values in FIG. 5 are at 31.72; 34.45; and 36.21, 1.0 which correspond to standard ZnO peaks as mentioned in the Joint Committee on Powder Diffraction Standards (JCPDS) Card No. 36-1451 $P6_3$ mc space group.

The fine white powder was also analyzed by the Brunauer-Emmett-Teller (BET) method. The BET surface area measurement showed that the ZnO obtained has a surface area of 27.8 $m^2$/gram.

Paint Formulation Using Nano-ZnO

The nano zinc oxide (n-ZnO) together with titanium dioxide ($TiO_2$) as the main pigment was used to formulate an acrylic water-based paint. The formulation was named "n-ZnO Formulation". The weight of the $TiO_2$ present in this formulation was 70% of that present in the Standard Formulation described below. A comparative acrylic water-based paint formulation based on $TiO_2$ pigments alone was made. This formulation was named "Standard Formulation".

When 30% of the required $TiO_2$ was replaced in the "n-ZnO Formulation" with nano zinc oxide, there was a decrease in the total pigment volume. This decrease in pigment volume was compensated by increasing the amount of silica and/or talc to keep the pigment volume concentration the same in the formulations shown in Table 3 below.

Contrast Ratio was measured using the ZEHNTNER Reflectometer, (Zehntner Testing Instruments, Switzerland). Accelerated storage studies were made by storing the paint at 60° C. for fourteen days and assessing the paint appearance visually for any cake formation, hard settlement and paint flow.

TABLE 3

Paint formulation using Nano-ZnO

| No. | Materials | Standard Formulation (in grams) | n-ZnO Formulation (in grams) |
|---|---|---|---|
| 1. | Thickener-1 (Aquaflow™ NHS 300, obtained from Hercules Inc., Delaware, USA) | 0.20 | 0.20 |
| 2. | Thickener-2 (Aquaflow™ NHS 300, obtained from Hercules Inc., Delaware, USA) | 0.10 | 0.10 |
| 3. | Dispersing agent (Coatex P 90, obtained from Coatex Inc, Arkema, South Carolina, USA) | 0.50 | 0.50 |
| 4. | Defoamer (Tego® Foamex 825, obtained from Evonik Industries, Germany) | 0.45 | 0.45 |
| 5. | Water | 30.58 | 28.00 |
| 6. | n-ZnO | -NA- | 1.50 |
| 7. | Titanium dioxide | 27.00 | 18.90 |
| 8. | Calcium Carbonate | 20.50 | 20.50 |
| 9. | Silica | 0.98 | 5.00 |
| 10. | Fumed Silica | 0.98 | 0.98 |
| 11. | Acrylic Resin emulsion (UCAR™ 362, obtained from The Dow Chemical Company, California, USA) | 43.5 | 43.5 |
| 12. | ROPAQUE™ emulsion (obtained from The Dow Chemical Company, California, USA) | 19.5 | 19.5 |
| 13. | Texanol (obtained from Eastman Chemical Company, Tennessee, USA) | 2.76 | 2.76 |
| 14. | 2-Amino-2-methyl-1-propanol + 5% water (AMP™-95 obtained from The Dow Chemical Company, California, USA) | 0.15 | 0.15 |

TABLE 3-continued

Paint formulation using Nano-ZnO

| No. | Materials | Standard Formulation (in grams) | n-ZnO Formulation (in grams) |
|---|---|---|---|
| | Contrast Ratio (Opacity) (%) | 91.83 | 93.81 |
| | Accelerated storage test | Pass--homogeneous Paint with slightly reduced flow | Fails-paint solidified into thick mass |

As can be seen from Table 3, the incorporation of nano zinc oxide, while increasing the opacity of the paint formulation, caused the paint formulation to gel and become unstable.

APPLICATIONS

The disclosed composition advantageously enhances the stability of a paint formulation without depriving the paint formulations from being economically feasible to produce or affecting the opacity of the paint formulation.

Advantageously, the disclosed composition permits a lower amount of expensive raw material required in paint formulations without depriving the paint formulations of the properties required. In embodiments, the composite of the present disclosure can be used as a partial replacement for the relatively more expensive titanium dioxide pigment in paint formulations. Furthermore, the disclosed composition possesses improved durability against the natural elements.

Advantageously, the disclosed composite confers antibacterial properties to the composition.

Advantageously, the disclosed composite improves the ultraviolet resistance of the composition, thereby conferring durability to the composition.

Advantageously, the disclosed composite does not leach out of the composition.

Advantageously, in embodiments, the disclosed composite of the present disclosure can be used as a partial replacement for conventional ZnO in the vulcanization of rubber.

In embodiments, the disclosed composite of the present disclosure can be used as a wide band width semiconductor in certain electronic applications.

In embodiments, the disclosed composite of the present disclosure can also be used to improve abrasion and wear resistance in polymer composites whether alone or in combination with other nanomaterials such as clay.

In embodiments, the disclosed composite of the present disclosure can be dispersed in organic solvents and polymers to improve the durability of organic polymer composites to the natural elements.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A paint formulation comprising:
   a composite pigment, comprising metal oxide as a first component and a second component selected from the group consisting of silica, silicate, and metal oxide, wherein a particle size of the metal oxide in the first component is in a range of 5 nm to 100 nm and a weight % amount of the composite pigment is in a range of 1 wt % to 5 wt % based on a total weight of the formulation;
   a particle size and amount of the composite pigment being selected to increase opacity of the paint formulation, the paint formulation having an opacity or contrast ratio greater than 85% in the visible range and due to back scattering;
   the metal oxide in the first component being selected from the group consisting of zinc oxide, aluminum oxide, antimony oxide, barium oxide, magnesium oxide, and zirconium oxide;
   the metal oxide in the second component being selected from the group consisting of zinc oxide, aluminum oxide, antimony oxide, barium oxide, magnesium oxide, and zirconium oxide;
   the metal oxide as the first component being at least partially covered by the second component;
   the composite pigment having an inhomogeneous morphology comprising a mixture of nanorods and multifaceted morphology; and
   the paint formulation being an acrylic water based paint, a water based vinyl paint, a polyurethane paint, an alkyd paint, a thermosetting paint, or a solvent based paint.

2. The paint formulation of claim 1, wherein the composite pigment has a core-shell structure.

3. The paint formulation of claim 2, wherein the composite pigment is of a hollow core-shell structure.

4. The paint formulation of claim 3, wherein the hollow core-shell structure consists of shells of alternating layers of first and second components.

5. The paint formulation of claim 1, further comprising at least one of 2-Amino-2-methyl-1-propanol and monoethylene glycol.

* * * * *